United States Patent [19]

Henderson et al.

[11] Patent Number: 5,171,173
[45] Date of Patent: Dec. 15, 1992

[54] TROLLING MOTOR STEERING AND SPEED CONTROL

[75] Inventors: William A. Henderson, Starkville, Miss.; Ronald M. Crews, Tempe, Ariz.

[73] Assignee: Zebco Corporation, Tulsa, Okla.

[21] Appl. No.: 558,156

[22] Filed: Jul. 24, 1990

[51] Int. Cl.⁵ .............................................. B60L 15/20
[52] U.S. Cl. .................................. 440/7; 114/153
[58] Field of Search ............ 440/6, 7, 58, 60; 114/144 R, 159, 144 E, 153; 74/478, 480 B, 481; 318/588

[56] References Cited

U.S. PATENT DOCUMENTS

| | | | |
|---|---|---|---|
| 2,877,733 | 3/1959 | Harris | 440/6 |
| 3,598,947 | 8/1971 | Osborn | 440/7 |
| 3,602,181 | 8/1971 | Harris | 440/7 |
| 3,662,243 | 5/1972 | Cavil et al. | 318/588 |
| 3,739,738 | 6/1973 | Cavil | 114/144 R |
| 3,807,345 | 4/1974 | Peterson | 440/7 |
| 3,995,579 | 12/1976 | Childre | 440/7 |
| 4,037,556 | 7/1977 | Harris et al. | 440/7 |
| 4,527,983 | 7/1985 | Booth | 440/7 |
| 4,565,529 | 1/1986 | Aertker et al. | 440/7 |
| 4,820,208 | 4/1989 | Phillips, Sr. | 440/7 |
| 4,838,818 | 6/1989 | Edwards | 440/7 |
| 4,854,902 | 8/1989 | Havins | 114/144 E |

Primary Examiner—Edwin L. Swinehart
Attorney, Agent, or Firm—Wood, Phillips, VanSanten, Hoffman & Ertel

[57] ABSTRACT

A servo controlled trolling motor steering system provides improved speed and steering control. The system includes apparatus for mounting the motor on a boat for rotation about an axis to effect steering of the boat. A foot pedal includes a base and a foot pad pivotally mounted to the base, the foot pad being pivotal by a user to command a desired steering direction. A membrane potentiometer senses rotational position of the motor to develop an electrical signal representative of the rotational position, the signal comprising a steering feedback signal. A second membrane potentiometer senses pivotal position of the foot pad relative to the base to develop an electrical signal representative of the pivotal position, the signal comprising a steering command signal. A steering control is mounted to the mounting apparatus for steering the trolling motor, including a servo driven gear set for rotating the trolling motor and an electrical control responsive to the steering command signal and the steering feedback signal for actuating the servo to rotate the trolling motor to steer the boat.

41 Claims, 8 Drawing Sheets

TROLLING MOTOR STEERING AND SPEED CONTROL

FIELD OF THE INVENTION

This invention relates to trolling motors and, more particularly, to a trolling motor steering and speed control.

BACKGROUND OF THE INVENTION

Trolling motors have long been used by fisherman and other boaters as an auxiliary motor on a boat for propelling the boat short distances and to provide precise positioning of the boat. Some trolling motors are hand steered while others offer a combination of hand and foot steering operation.

One known form of trolling motor uses a foot pedal including a pivotal foot pad connected to a rigid cable. The rigid cable is connected to a gear mechanism in a trolling motor control head, such as through a rack and pinion, which in turn rotates the trolling motor to provide steering. Speed control is effected electrically by a horizontal sliding movement of the foot pad to rotate a knob which actuates a potentiometer forming part of a speed control circuit. Suitable switches are provided for on/off control and for achieving maximum speed control. Such a foot pedal is described in Peterson U.S. Pat. No. 3,807,345.

With a trolling motor it is desirable that the control thereof operate in unison with a fisherman. The motor should instantly respond to the subtlest foot movements, propelling a boat in virtually any direction. Further, it is desirable that the trolling motor control provide greater precision and less fatigue in operation.

The present invention is intended to satisfy such desires.

SUMMARY OF THE INVENTION

It is an object of the invention to provide an improved trolling motor steering and speed control system.

Broadly, there is disclosed herein a trolling motor steering system. The steering system includes means for mounting the motor on a boat for rotation about an axis to effect steering of the boat. A foot pedal includes a base and a foot pad pivotally mounted to the base, the foot pad being pivotal by a user to command a desired steering direction. First means are provided for sensing rotational position of the motor to develop an electrical signal representative of the rotational position, the signal comprising a steering feedback signal. Second means are provided for sensing pivotal position of the foot pad relative to the base to develop an electrical signal representative of the pivotal position, the signal comprising a steering command signal. Electrical steering means are mounted to the mounting means for steering the trolling motor, including drive means for rotating the trolling motor and electrical control means responsive to the steering command signal and the steering feedback signal for actuating the drive means to rotate the trolling motor to steer the boat.

In accordance with one aspect of the invention there is disclosed a trolling motor steering system including means for mounting the motor on a boat for rotation about an axis to effect steering of the boat. A foot pedal includes a fixed member and a rotatable member rotatably mounted to the fixed member, the rotatable member being rotatable by a user to command a desired steering direction. Means are provided for limiting relative rotation between the fixed and rotatable members. Means are provided for sensing relative rotational position between the fixed and rotatable members and generating an electrical signal representative thereof, the signal comprising a steering command signal. Electrical control means are mounted to the mounting means for steering the trolling motor, including drive means for rotating the trolling motor, electrical control means responsive to the steering command signal for actuating the drive means to rotate the trolling motor to steer the boat, and converting means operatively associated with the drive means and the control means for converting a selected rotational movement of the rotatable member, represented by the steering command signal, to a greater rotational movement of the trolling motor.

It is a feature of the invention wherein the converting means convert rotational movement of the trolling motor relative to the rotatable member by a ratio of at least four to one.

It is a further feature of the invention that the steering system comprises means for limiting rotational movement of the trolling motor to an angular value in excess of 360°, and wherein complete rotational movement of the rotatable member corresponds to complete rotational movement of the trolling motor.

It is another feature of the invention wherein the first limiting means limits rotational movement of the rotatable member to an angular value less than 180°.

It is yet another feature of the invention that the steering system comprises means for limiting rotational movement of the trolling motor to an angular value between approximately 380° and 400°.

It is yet another feature of the invention wherein the first limiting means limits rotational movement of the rotatable member to an angular value of approximately 90°.

It is still another feature of the invention wherein the drive means comprises a driven pinion fixedly connected to a rotating tube carrying the trolling motor and a rack intermeshed with the pinion for linear movement relative thereto, the rack being mounted for limited linear movement in a gear housing to limit rotational movement of the pinion and thus the trolling motor.

In accordance with another aspect of the invention there is disclosed herein a trolling motor steering system including means for mounting the motor on a boat for rotation about an axis to effect steering of the boat. A foot pedal includes a fixed member and a rotatable member rotatably mounted to the fixed member, the rotatable member being rotatable by a user to command a desired steering direction. Means are provided for sensing relative rotational position between the fixed and rotatable members and generating an electrical signal representative thereof, the signal comprising a steering command signal. Electronic steering means are mounted to the mounting means for steering the trolling motor, including drive means for rotating the trolling motor and electrical control means responsive to the steering command signal for actuating the drive means to rotate the trolling motor to steer the boat, wherein the drive means comprises a driven pinion fixedly connected to a rotating tube carrying the trolling motor and a rack intermeshed with the pinion for linear movement relative, the rack being mounted for limited linear movement in a gear housing to limit rotational movement of the pinion and thus the trolling motor.

In accordance with another aspect of the invention there is disclosed herein a trolling motor steering system including means for mounting the motor on a boat for rotation about an axis to effect steering of the boat. A foot pedal includes a fixed member and a rotatable member rotatably mounted to the fixed member, the rotatable member being rotatable by a user to command a desired steering direction. Means are provided for sensing relative rotational position between the fixed and rotatable members and generating an electrical signal representative thereof, the signal comprising a steering command signal. Steering means are mounted in a housing to the mounting means for steering the trolling motor, including drive means for rotating the trolling motor, control means responsive to the steering command for actuating the drive means to rotate the trolling motor to steer the boat, a rotary indicator mounted to the housing to indicate steering direction, and a belt drive connecting the drive means to the indicator so that the indicator rotates in response to rotational movement of the trolling motor.

It is a feature of the invention that the drive means comprises a drive pulley fixed relative to and rotational with the trolling motor and the indicator is fixed relative to and rotational with a driven pulley, and a belt is driven by the drive pulley to drive the driven pulley.

It is another feature of the invention wherein the pulleys comprise toothed pulleys and the belt comprises a cogged belt.

There is disclosed herein in accordance with yet another aspect of the invention a trolling motor steering system comprising means for mounting the motor on a boat for rotation about an axis to effect steering of the boat. A foot pedal includes a base and a foot actuable member pivotally mounted to the base, the foot actuable member being movable by a user to command a desired steering direction. Means are provided for sensing relative pivotal movement between the base and foot actuable member and generating a steering command representative thereof. Steering means are mounted to the mounting means for steering the trolling motor, including drive means for rotating the trolling motor and control means responsive to the steering command for actuating the drive means to rotate the trolling motor to steer the boat. The drive means comprises a friction clutch having a clutch output shaft operatively coupled to the trolling motor and including an annular shoulder. An input gear is driven by the control means and is coaxial with the shaft and seated on the shoulder. Biasing means are provided for maintaining the input gear in frictional engagement with the shoulder so that the shaft is rotational with the input gear in the absence of a force acting on the trolling motor in excess of frictional forces of the engagement.

It is a feature of the invention wherein the shoulder and the input gear include engaged radially extending teeth to define a friction, ratchet clutch.

It is a further feature of the invention wherein the input gear comprises a plastic gear.

There is disclosed herein in accordance with yet a further aspect of the invention a trolling motor steering system comprising means for mounting the motor on a boat for rotation about an axis to effect steering of the boat. First means are provided for sensing rotational position of the motor to develop an electrical signal representative of the rotational position, the signal comprising a steering feedback signal. A foot pedal includes a base and a foot pad pivotally mounted to the base, the foot pad being pivotal by a user to command desired steering direction. Second means are provided for sensing pivotal position of the foot pad relative to the base to develop an electrical signal representative of the pivotal position, the signal comprising a steering command signal. Electrical steering means are mounted to the mounting means for steering the trolling motor, including drive means for rotating the trolling motor and electrical control means responsive to a difference between the steering command signal and the steering feedback signal for actuating the drive means to rotate the trolling motor to steer the boat, the control means including means for varying speed of the drive means in response to a level of the difference.

It is a feature of the invention wherein the drive means comprises a servo motor and the electrical control means includes a bridge circuit for selectively energizing the servo control motor responsive to a non-zero difference between the feedback signal and the command signal.

It is another feature of the invention wherein the bridge circuit controls polarity of energization of the servo control motor responsive to polarity of the difference.

It is yet an additional feature of the invention wherein the varying means includes an oscillator circuit which varies duty cycle of the control responsive to the level of the difference.

Further features and advantages of the invention will readily be apparent from the specification and from the drawings.

DESCRIPTION OF THE INVENTION

Figure 1:
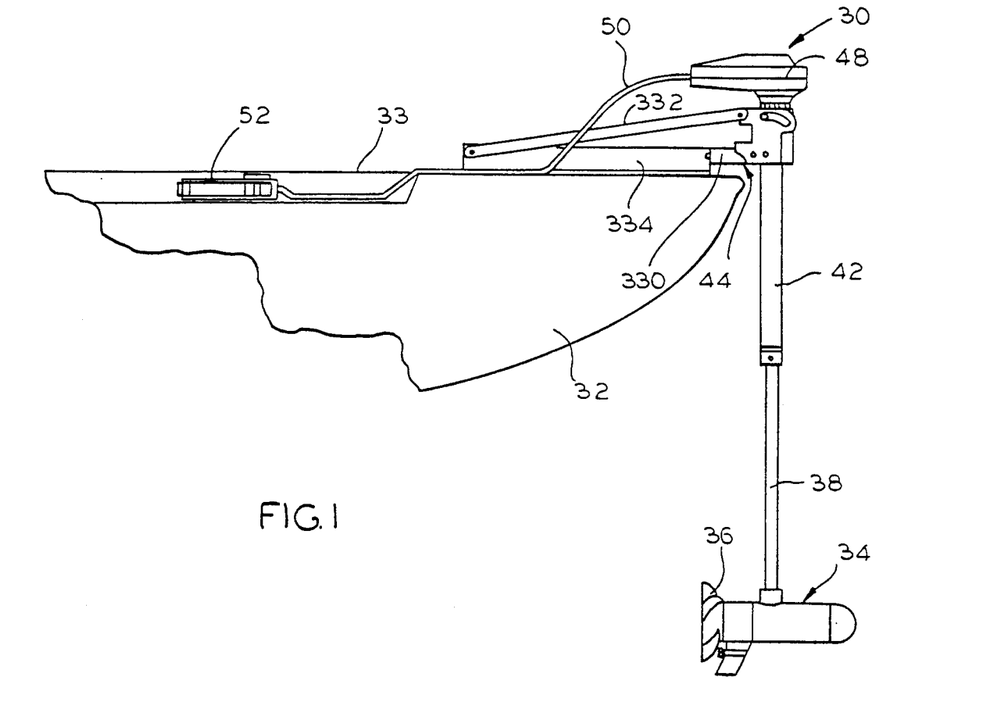
FIG. 1 is a partial, side elevation view of the bow of a boat including a trolling motor steering and speed system in accordance with the invention.
Figure 2:
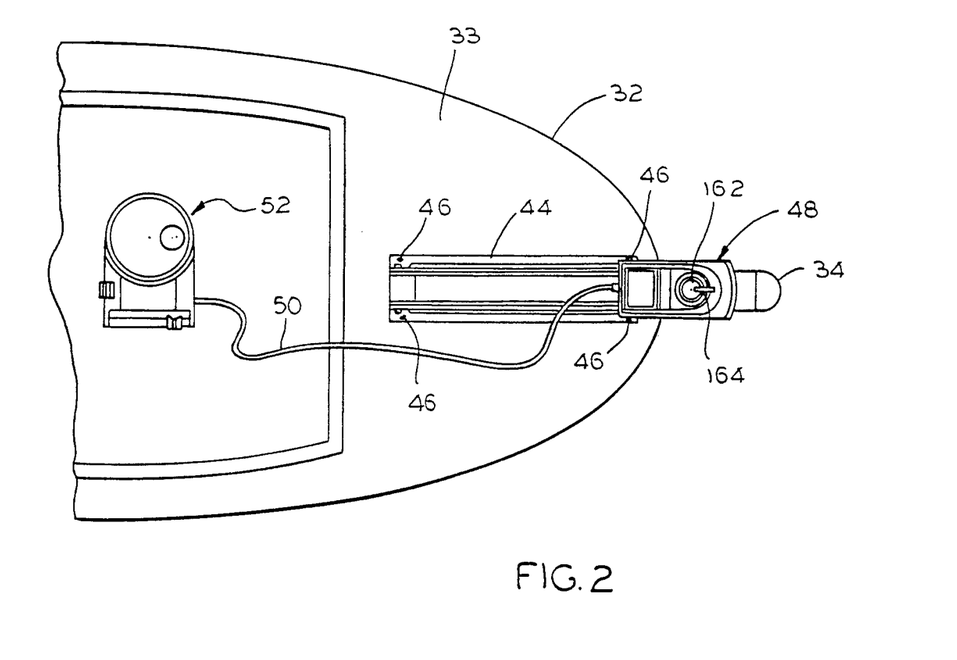
FIG. 2 is a partial plan view of the bow of the boat of FIG. 1.

With reference to FIGS. 1 and 2, a trolling motor system 30 in accordance with the invention is illustrated for use in connection with a boat 32 having a deck 33. Particularly, the system 30 is shown mounted at the bow of the boat, on the deck 33, to effect propulsion and steering of the boat 32. Alternatively, the system 30 could be stern mounted in accordance with the different aspects of the invention.

The system 30 includes a trolling motor 34 having a propeller 36 rotatably driven thereby. The motor 34 is connected to a rotating tube, or column, 38 rotatably received in a fixed tube 42. The fixed tube 42 is mounted to the boat 32 using a four bar linkage mounting mechanism 44 secured as by fasteners 46 to the deck 33. The mounting mechanism 44 is movable between an operative position shown in FIG. 1, with the column 38 generally vertical, and a stowed position, with the column 38 generally horizontal and resting on a deck channel 334 of the mounting mechanism 44.

A control head 48 is mounted at the upper end of the fixed tube 42 and includes suitable circuitry and a gear drive for controlling speed of the trolling motor 34 as well as angular position of the trolling motor 34 for steering. A multiconductor cable 50 operatively connects the control head 48 to a deck mounted foot pedal 52. As discussed in greater detail below, the foot pedal 52 may be operated by a user sitting on the boat deck 33 to control steering and speed of the trolling motor 34, and thus the boat 32.

Figures 3, 4:
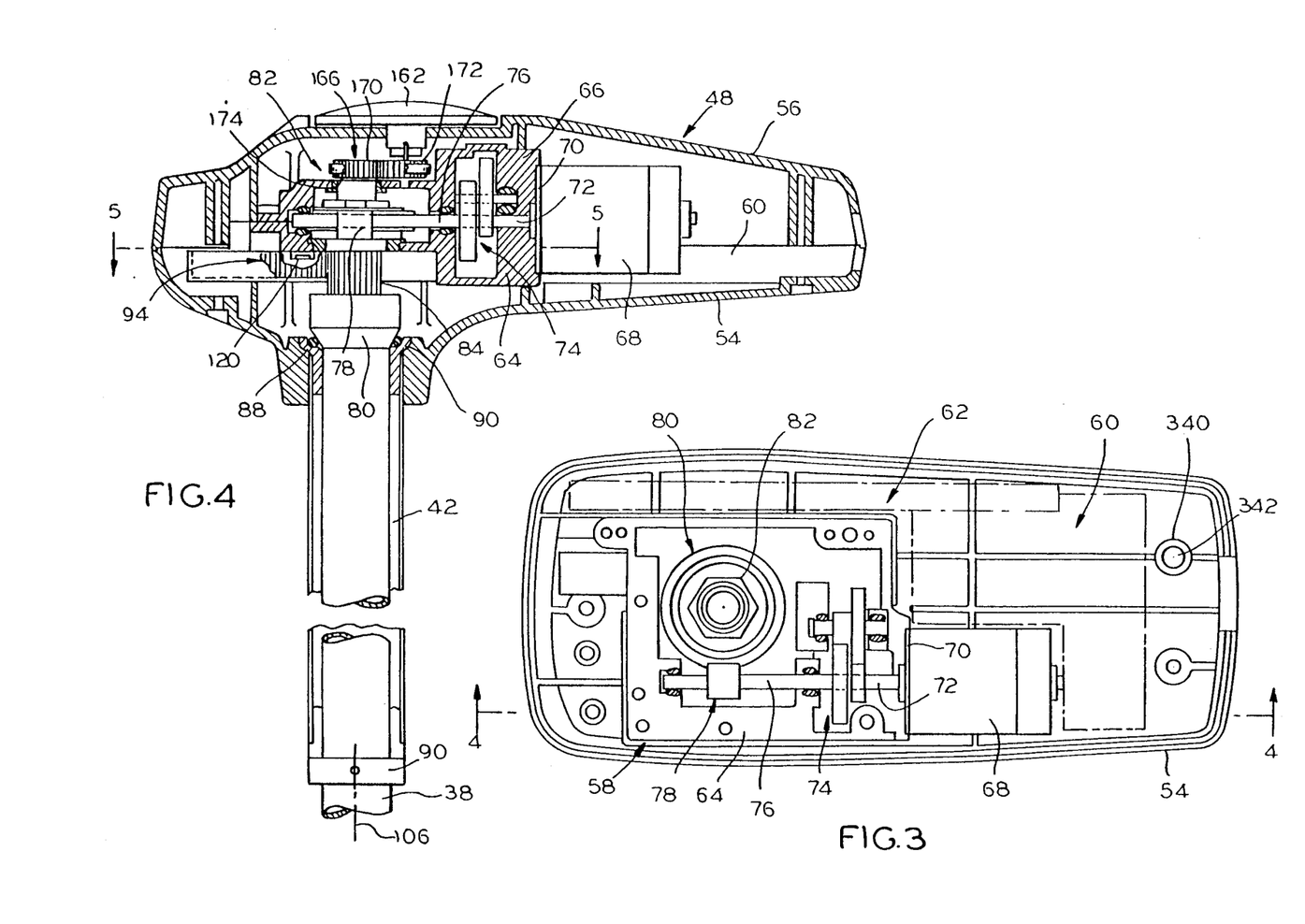
FIG. 3 is a plan view illustrating the trolling motor control head, with a housing cover and upper gear case removed for clarity.
FIG. 4 is a sectional view taken along the line 4—4 of FIG. 3.

With reference also to FIGS. 3 and 4, the head 48 includes a housing base 54 and a housing cover 56, housing a gear case 58, a relay control board 60 and an electronic control board 62. Specifically, the gear case 58 and the control boards 60 and 62 comprise subassemblies which provide a modular construction which permits the drive system to be readily assembled, as discussed below.

The gear case 58 includes a lower gear case 64 fastened to an upper gear case 66. A servo motor 68 includes a flange 70 sandwiched between the upper and lower gear cases 64 and 66 to mount the same. The servo motor 68 comprises a DC motor having a motor shaft 72 which rotates in a direction corresponding to polarity of electrical power supplied to the motor. The shaft 72 is connected to and drives a reduction gear set 74 which develops motive power at an output shaft 76. A worm gear 78 is fixedly connected for rotation with the output gear 76. The worm gear 78 drives a corresponding worm gear 80 defining an input gear of a friction clutch 82 which drives an output pinion 84, see FIG. 4. The pinion 84 includes an enlarged lower head 86 threadably connected to the column 38. A set screw, not shown, maintains fixed engagement between the pinion head 86 and the column 38. The upper end of the column 38 is telescopically received in the fixed tube 42 which is fixedly connected to the housing base 54 as at 88 in any known manner. Bearing systems 90 are provided for facilitating rotation of the column 38 within the fixed tube 40.

Owing to the above-described relationship, rotation of the servo motor shaft 70, in either direction, drives the worm gears 78 and 80 at a reduced speed which in turn rotates the column 38 through the friction clutch 82. Particularly, energization of the servo motor 68 in one direction results in turning the column 38 to steer the boat 32 in one direction, while energizing the servo motor 68 in the opposite direction results in opposite rotation of the column 38 and thus steering the boat 32 in an opposite direction.

Figure 5:
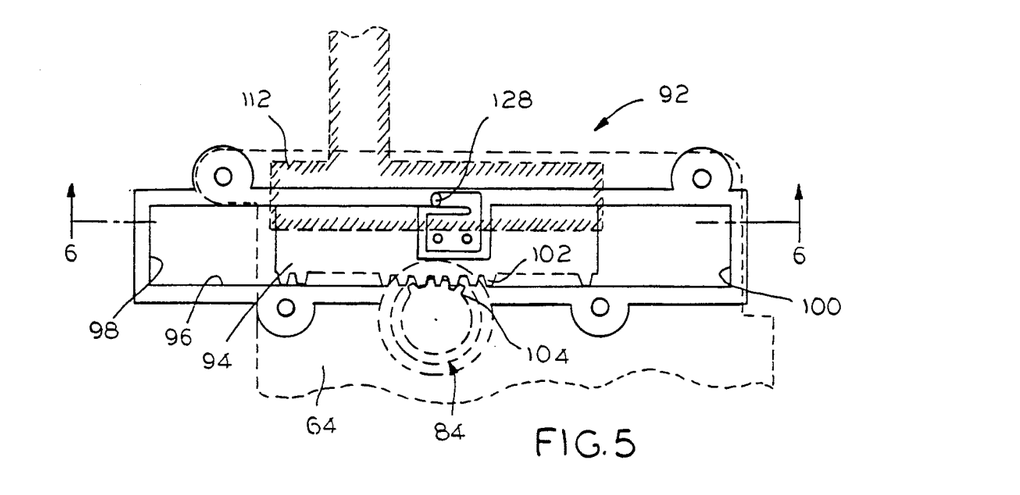
FIG. 5 is a sectional view taken along the line 5—5 of FIG. 4, particularly illustrating a motor rotational position feedback system in accordance with the invention.
Figure 6:
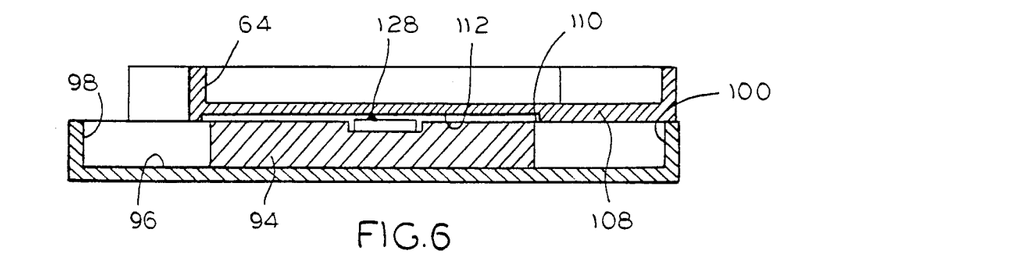
FIG. 6 is a sectional view taken along the line 6—6 of FIG. 5.

With reference also to FIGS. 5 and 6, an electrical feedback system 92 is provided for generating a feedback signal representing absolute angular, or rotational, position of the column 38, and thus also direction of steering of the boat 32.

The feedback system 92 is driven by the pinion 84 and thus senses absolute column position relative to the boat 32. The feedback system 92 includes an elongated rack 94 slidably mounted within an elongate rectangular housing 96 mounted at the bottom of the lower gear case 64. Particularly, the rack 94 is slidably movable in the housing 96 between opposite end walls 98 and 100. Owing to the intermeshing between teeth 102 on the rack 94 and teeth 104 on the pinion 84, the rack 94 slides responsive to rotation of the pinion 84. However, rotation of the column 38 is effectively limited. More particularly, as the rack 94 abuts either end wall 98 or 100, movement of the rack 94, and thus pinion 84 and column 38, is further prohibited.

In accordance with the invention, the length of the channel 96 and rack 94, as well as the gearing relationship, is selected so that complete movement of the rack 94, between the specified limits, corresponds to complete, limited rotation of the column 38 in a range between 380° and 400° about an axis represented by a line 106, see FIG. 4.

If the rack 94 is longitudinally centered in the housing 96, then the motor 34 is positioned with the propeller 36 directed rearwardly, as shown in FIG. 1. Such steering results in straight ahead movement of the boat 32. If it is necessary to propel the boat 32 in a rearward direction, then the trolling motor 34 is rotated more than 90° in the selected direction. If it is necessary that the boat 32 be moved in a straight reverse direction, then the trolling motor 34 is rotated 180°. However, if rotation were limited to 180° in either direction, for a total rotation of 360°, then precise steering in the reverse direction would be difficult. For example, if is necessary to provide a slight corrective action in course, then it might be necessary to rotate the motor 34, for example, on the order of 350° to provide such correction, i.e, from 175° to order 175°. By allowing rotation greater than 360° total, then precise steering can be effected in the reverse direction without having to first rotate the trolling motor 34 through an almost complete revolution.

The lower gear case 64 includes a lower wall 108 serving to maintain the rack 94 within the housing 96. Mounted within an indentation 110 in the wall 108 is an elongate membrane potentiometer 112. The membrane potentiometer 112 may comprise a Soft Pot ® membrane potentiometer such as manufactured by Spectra Symbol. The membrane potentiometer 112 is a normally open, deactivated, contact device which is closed when an actuator is depressed thereon to provide a contact between the conductive and resistive elements sealed and contained therein. Particularly, with suitable power provided to the membrane potentiometer, as with a standard potentiometer, the membrane potentiometer 112 yields an infinitely variable analog voltage corresponding to the linear position of the actuator on the potentiometer 112.

Figure 7:
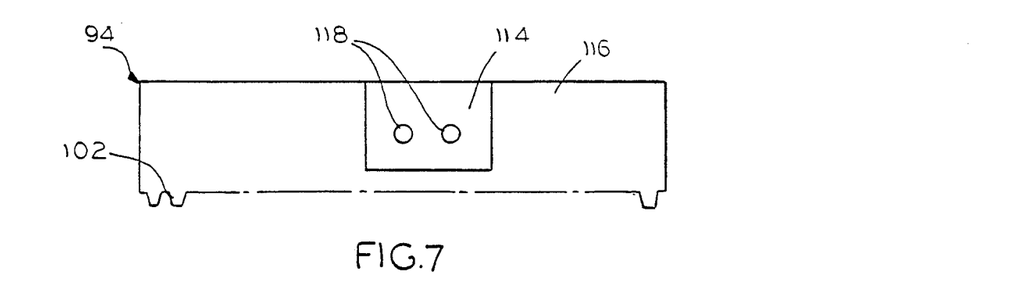
FIG. 7 is a plan view of a rack for the feedback system of FIG. 5.
Figure 8:
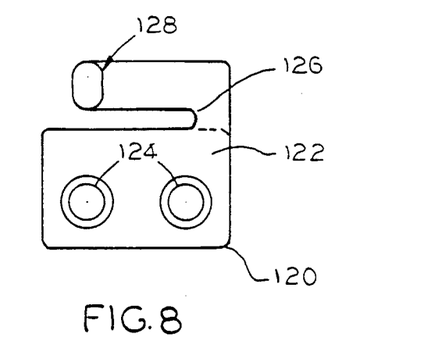
FIGS. 8 and 9 comprise a plan view and a side view, respectively, of a feedback system potentiometer actuator.
Figure 9:
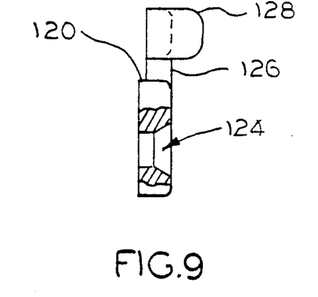

With reference also to FIG. 7, the rack 94 includes an indentation 114 in an upper wall 116 thereof. The indentation 114 includes a pair of apertures 118. A feedback potentiometer actuator 120 is provided for actuating the feedback potentiometer 112. The actuator 120 may be of molded plastic construction and includes a base 122 having a pair of apertures 124. The size of the base 122 corresponds to the size of the rack indent portion 114, as does the spacing between the apertures 124 correspond to the spacing between the apertures 118. The actuator 120 is fastened to the rack with suitable fasteners inserted through the actuator apertures 124 into the rack apertures 118. An L-shaped arm 126 is connected to the base 122 and at its distal end includes an upwardly extending actuator tip 128. As seen in FIG. 6, the tip 128 extends upwardly above the rack 94 and is in facial engagement with the feedback potentiometer 112.

Figure 10:
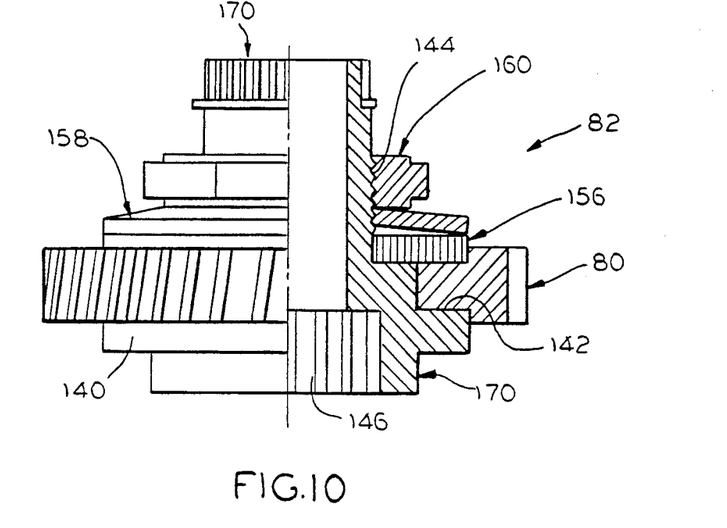
FIG. 10 is a partially cut-away, elevation view of a friction clutch in accordance with the invention connecting the trolling motor to the steering drive.
Figure 11:
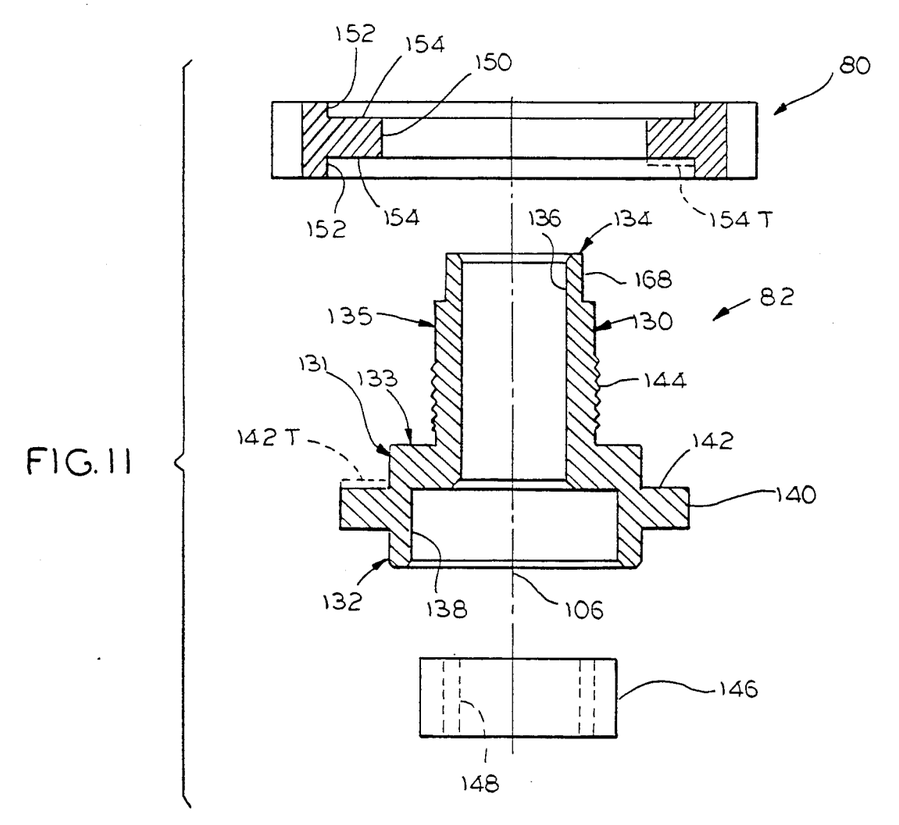
FIG. 11 is a partial exploded view of the friction clutch of FIG. 10.

As the rack 94 is slidably moved within the housing 96, the longitudinal position of the actuator tip 128 relative to the feedback potentiometer 112 varies. The coaction of the tip 128 with the feedback potentiometer 112 operates similar to that of the wiper of a conventional potentiometer and varies the potentiometer resistance, and thus analog voltage developed thereby, proportional to the longitudinal position of the rack 94 within the housing 96. Thus, the feedback system 92 serves to provide feedback as to the actual rotational or angular position of the column 38, and thus trolling motor 34. With reference to FIGS. 10 and 11, the friction clutch 82 is illustrated in greater detail.

The clutch 82 includes a clutch output shaft 130 coaxial with the axis on the line 106. The output shaft 130 includes a relatively large diameter cylindrical wall 131 at an Output end 132 which steps down at a shoulder 133 to a reduced diameter cylindrical wall 135 at an indicator end 134. A longitudinal bore 136 extends axially through the output shaft 130 and includes an enlarged bore 138 at the output end 132. An annular flange 140 extends radially outwardly of the output end cylindrical wall 131 to define an annular shoulder 142. The indicator end cylindrical wall 135 is provided with a threaded midsection 144.

A splined insert 146 has an outer diameter slightly greater than an inner diameter of the shaft output end bore 138 and is force fit therein. The splined insert 146 includes internal splines 148 for intermeshing with the pinion 84, discussed above, when the pinion 84 is received therein. The worm gear, or clutch input gear, 80 may be of, for example, plastic construction. The worm gear 80 includes a central axial bore 150 having an inner diameter corresponding to an outer diameter of the output shaft cylindrical wall 131. An enlarged bore 152 is provided at either axial end of the worm gear 80 to define annular shoulders 154. The inner diameter of the enlarged bores 152 is selected to be corresponding to the outer diameter of the output shaft flange 140.

The worm gear 80 is mounted coaxial with the output shaft 130 with a worm gear annular shoulder 154 seated on the output shaft annular shoulder 142. A flat washer 156 sandwiches the worm gear 80 on the flange 140. Particularly, the flat washer 156 includes an outer diameter generally corresponding to that of the flange 140 and is thus seated in the opposite shoulder 154 of the worm gear 80. Although not shown, a central opening of the washer 156 may include flatted portions coacting with similar flatted portions on the clutch output shaft 130 to prevent rotation of the washer 156 relative to the output shaft 130. A Belleville washer 158 is placed above the washer 156 and is secured to the output shaft 130 using a clutch nut 160 threaded to the output shaft threaded portion 144. Thus, force generated by the Belleville washer through the washer 156 to the worm gear 80 provides a frictional engagement between the worm gear 80 and the output shaft 130.

The clutch 82 protects the gear train in the gear case 58 from an excessive torque condition. Such a condition could exist if the trolling motor's rotating tube 38 is prevented from rotating due to the trolling motor 34 being jammed or stuck against an underwater obstruction or the rack 94 is against a stop. During normal operation, rotation of the worm gear 80 driven by rotation of the servo motor 68, as discussed above, causes a corresponding rotation of the output shaft 130 and the splined insert 146 to effect rotation of the column 38. However, if the trolling motor 34 encounters an excessive torque condition, forcing rotation of the same, and if the forces are sufficient to overcome the frictional forces developed by the friction clutch 82 then the output shaft 130 is free to rotate relative to the worm gear 80.

In accordance with an alternative embodiment of the invention, the output shaft shoulder 142 may include radially extending teeth 142T. Similarly, the worm gear shoulder 154 may include radially inwardly extending teeth 154T. Coaction of the worm gear teeth 154T with the output shaft teeth 142T operates much like a ratchet to provide a friction, ratchet clutch.

In order to indicate steering direction of the trolling motor 34, a direction indicator 162 is rotatably mounted to the housing cover 56. The direction indicator 162 includes a pointer 164 which points 180° from the propeller 36 relative to the axis 106 to indicate direction which the propeller 36 is operative to steer the boat 32. For example, with the propeller 36 directed straight rearwardly, then the direction indicator pointer 164 points straight ahead. The direction indicator 162 is driven from the clutch output shaft 130 via a belt drive system 166.

With reference again to FIGS. 10 and 11, the friction clutch output shaft 130 is straight knurled as at 168 at the indicator end 134. A drive pulley 170 is force fit on the knurled end 168 so that it is fixed to and rotational with the output shaft 130. A driven pulley 172, shown in FIG. 4, is staked to the direction indicator 162 so that it is fixed to and rotational therewith. In the illustrated embodiment, the drive pulley 170 and driven pulley 172 comprise toothed pulleys. A cogged belt 174 surrounds the drive pulley 170 and the driven pulley 172 to translate rotary motion from the drive pulley 170 to the driven pulley 172. Thus, rotation of the column 38 provides a corresponding rotation through the belt drive system 166 to the direction indicator 162 to provide a visual indication as to trolling motor steering direction.

Figures 12, 13:
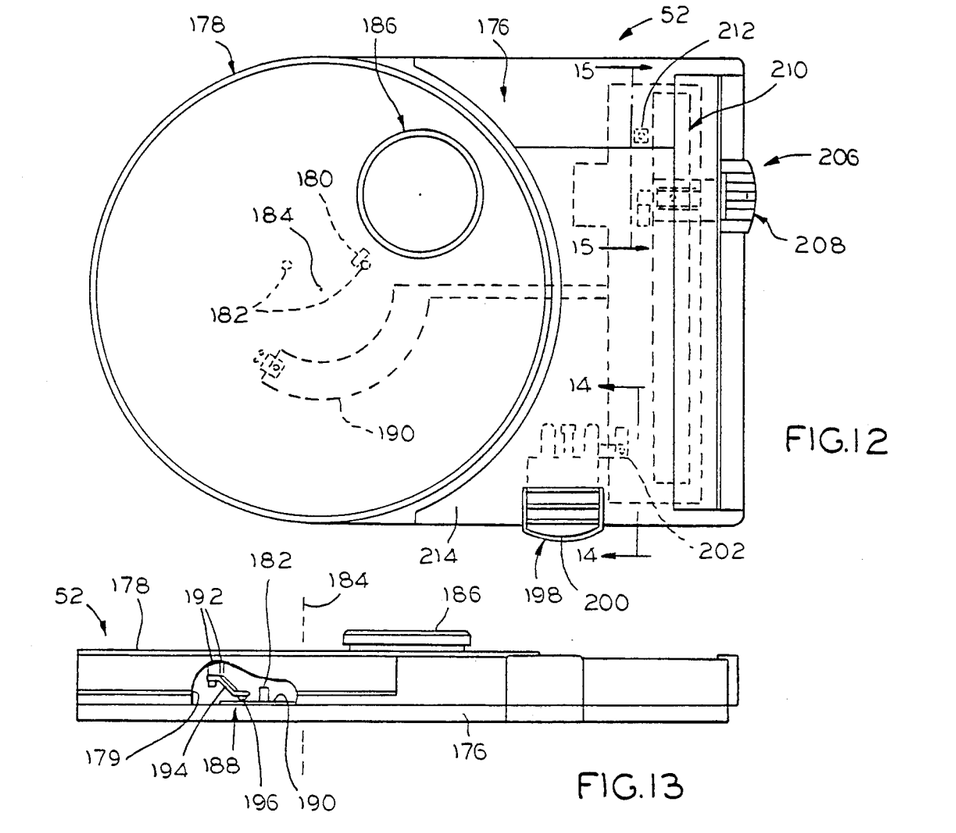
FIG. 12 is a plan view of a foot pedal of the system of FIG. 1.
FIG. 13 is a side, partially cut-away, view of the foot pedal of FIG. 12.

With reference now to FIGS. 12 and 13, the foot pedal 52 can be used by a boater for controlling both steering and speed of the trolling motor 34.

The foot pedal 52 comprises a fixed base member 176 which may be mounted to the deck of the boat 32 in any desired position. A rotatable foot pad member, or turntable, 178 is rotatably mounted in any known manner to the base 176 to define an inner chamber 179. Particularly, the turntable 178 is rotatable by a users foot to command a desired steering direction of the boat. The turntable 178 includes a downwardly depending tab 180, shown in dotted line in FIG. 12. A pair of upwardly extending bosses 182 are connected to and extend upwardly from the base 176 in the chamber 179. In accordance with the invention, the bosses 182 are positioned approximately 90° apart relative to a rotational axis 184 of the turntable 178. The radial spacing of the tab 180 from the axis 184 is identical to that of the bosses 182. Thus, the bosses 182 obstruct the tab 180 during rotation of the turntable 178 and, in fact, limit rotation of the turntable to 90°. A momentary contact actuator 186 is mounted to the turntable 178 and can be depressed by a user's foot to momentarily close a contact, discussed below, to energize the trolling motor 34. Particularly, if the actuator 186 is maintained in the depressed position, then the trolling motor 34 is energized. Once the actuator is released, then the trolling motor 34 is deenergized.

The foot pedal 52 includes a steering command system 188 comprising a membrane potentiometer 190 mounted to the base 176 in the space 179. The steering command potentiometer 190 is a membrane potentiometer, similar to the feedback potentiometer 112, discussed above. However, rather than being a linear shaped potentiometer, the steering command potentiometer 190 is arcuate shaped and is usable over a 90° arc about the axis 184, corresponding to the 90° rotation of the turntable 178. A pair of bosses 192 depend downwardly from the underside of the turntable 178 and connect to a flexible wiper arm 194. A plastic round hemispheric actuator tip 196 is staked to the end of the wiper 194 and is positioned relative to the axis 184 so that it depresses the potentiometer 190 during rotation of the turntable 78. Thus, the actuator 196 operates with the potentiometer 190 as a wiper does with a conventional potentiometer to vary the resistance of the potentiometer 190. Thus, the command system 88 provides an analog voltage signal proportional to the actual turntable rotational position.

Operation of the foot pedal 52 is effective to steer the trolling motor, as discussed in greater detail below. Particularly, with the turntable 178 effectively centered, as shown in FIG. 2, the trolling motor 34 is positioned as shown in FIG. 2 to steer the boat 32 in a forward direction. If the turntable 178 is rotated clockwise, to the position shown in FIG. 12, then the boat 32 is steered to the right. Counterclockwise rotation of the turntable 178 steers the boat 32 to the left.

In accordance with the invention, the servo motor 68 is controlled to maintain the steering command generated by the steering command potentiometer 190 to be equal to the actual position measured by the feedback potentiometer 112. Further, the full 90° limited rotation of the turntable 178 corresponds to the full, limited movement of the rack 94 which, as discussed above, corresponds to 380° to 400° range of rotation of the trolling motor 34. Thus, from the straight-ahead steering direction, the operator can, by moving the turntable 178 anywhere from 0° to 45° in either direction, rotate the trolling motor 34 anywhere from 0° to 190° or 200° in the corresponding direction. Thus, precise positioning of the boat 32 can be maintained, including in the reverse direction.

The specific angular relationships described above are selected to provide desired operational parameters for a fisherman. However, the specific values could be modified to suit more specific needs as by suitably increasing or decreasing values of such parameters, and or the ratios therebetween. For, example the indicated command to feedback value ratio which is in excess of four to one, i.e., 380/90 could be selected to be of a different value, such as by increasing the available rotational movement of the turntable 178.

Figure 14:
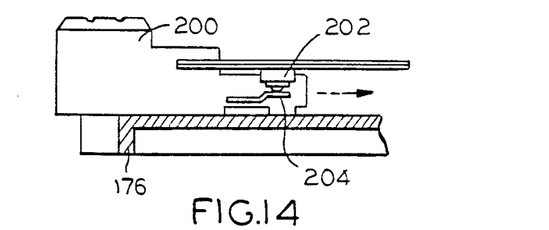
FIG. 14 is a sectional view taken along the line 14—14 of FIG. 12.

Under certain circumstances, it may be desirable to maintain the trolling motor 34 continually energized, such as when moving the boat 32 greater distances. In order to avoid fatigue caused by maintaining the momentary actuator 186 depressed, a constant on switch 198 is provided. The constant on switch 198 includes an actuator 200 slidably mounted to the base 176 and a normally opened miniature electrical switch 202. The actuator 200 includes an arm 204 which is aligned with the switch 202. With the actuator 200 moved outwardly from the base 176, to the position shown in FIG. 14, the actuator arm 204 is operable to actuate the switch 202. When the actuator 200 is moved inwardly, as illustrated by the arrow in FIG. 14, the switch 202 is deactuated and its contact returns to its normally open position. In order to avoid inadvertent actuation of the constant on switch 198, it is necessary to move the actuator outwardly so that an inadvertent kick by the user's foot would not energize the trolling motor 34.

To control speed of the trolling motor 34, a speed control system 206 is provided in the foot pedal 52. The speed control system 206 includes an actuator slidably mounted at one edge of the base member 176, a membrane speed command potentiometer 210 and a high bypass switch 212.

Figure 16:
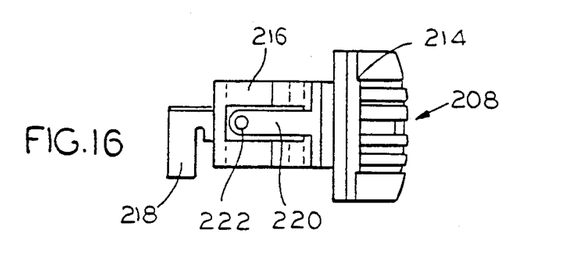
FIGS. 16–18 illustrate a plan, and front and side elevation views, respectively, of a speed command potentiometer actuator of the foot pedal of FIG. 12.
Figure 17:
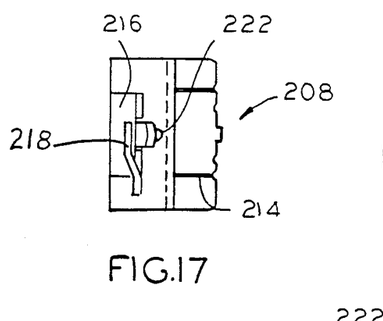
Figure 18:
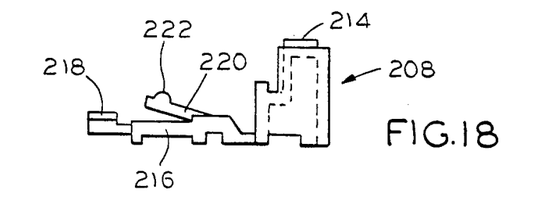

The membrane potentiometer 210 is similar to the feedback potentiometer 112, discussed above, albeit longer. With reference also to FIGS. 16-18, the actuator 208 includes a user engageable portion 214 which may be engaged by a user's foot for sliding the actuator 208 relative to the base 176. The user engageable portion 214 is connected via a connector portion 216 to an angled switch arm 218. Disposed immediately above the connecting portion 216 is an upwardly extending wiper arm 220 having an actuator tip 222 at its distal end. The position of the tip 222 is such that, as the actuator 208 slides along the edge of the base, the tip 222 engages the potentiometer 210 to vary the resistance thereof. Again, the tip 222 operates in connection with the potentiometer 210 as the wiper of a conventional potentiometer.

Figure 15:
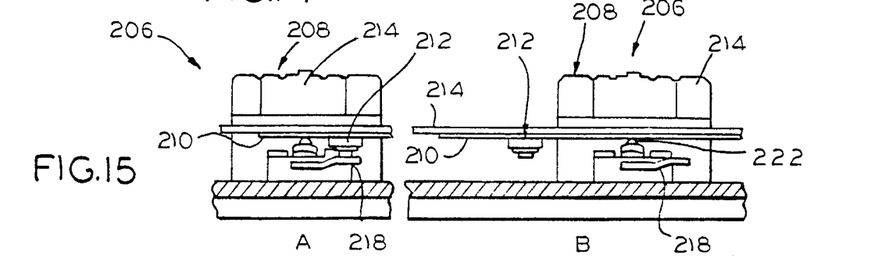
FIGS. 15A and 15B comprise sectional views taken along the line 15—15 of FIG. 12 illustrating a high bypass switch in two different operative positions.

The switch arm 218 is operable so that when the actuator 208 is slid fully forwardly it actuates the high bypass switch 212. The high bypass switch 212 is used to ignore the speed command system 206 and operate the trolling motor 34 at its maximum speed, as discussed below. Particularly, FIGS. 15A and 15B illustrate the high bypass switch in the actuated and unactuated positions, respectively. These figures also illustrate the tip 222 in contact with the membrane potentiometer 210 which is mounted to the underside of a base top wall 214. As shown in FIG. 15A, from the high bypass position, the actuator 208 can be moved only rearwardly, while from the midposition of FIG. 15B, the actuator 208 can be moved either forwardly or reverse to respectively speed up or slow down the trolling motor 34.

One objective in providing an electrically controlled trolling motor is to make the connection, via the cable 50, see FIG. 1, as small and flexible as possible. Replacing prior mechanical control cables with relatively small electric steering control wires provides significant improvements, but other motor functions such as motor on/off control and high bypass require significant current carrying capability. In accordance with the invention, the relay board 60, see FIG. 3, contains contactors or relays to switch such high current functions, with the switches 202 and 212 in the foot pedal 52 being electrically connected to such relays for driving the same. Thus, smaller relay control wires can be used in the cable 50 to make the cable even smaller and more flexible.

Figure 19:
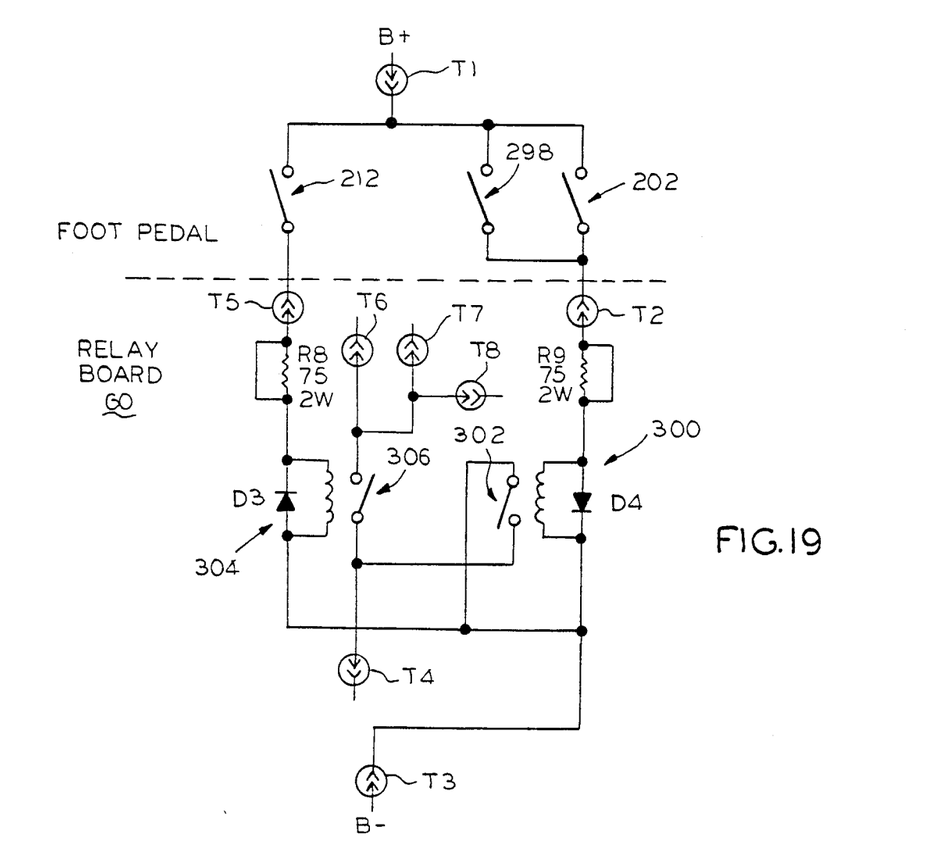
FIG. 19 is a schematic diagram illustrating a relay control circuit in accordance with the invention.

With reference to FIG. 19, a schematic diagram illustrates components used on the relay board 60 and showing their interconnection with the switches 202 and 212, and also a momentary on switch 298, in the foot pedal 52. The momentary on switch 298 is operated by the turntable actuator 186, see FIG. 12.

Electrical connections between the foot pedal 52 and components on the relay board 60, control board 62 and the servo motor 68 are made using a suitable wire harness (not shown) or separate conductors. For simplicity herein, any connections between such devices are illustrated as terminal connections and are reference with the prefix "T".

Power to the system 30 is provided using a conventional battery in the boat 32. The battery may be either a 12-volt DC battery or a 24-volt DC battery, as necessary. The plus side of the battery, referenced B+, is connected via a terminal T1 to one side of the parallel connected on/off switch contacts 202 and 298 and to the high bypass switch contact 212 in the foot pedal 52. The opposite side of the on/off contacts 202 and 298 is connected via a terminal T2 and through a resistor R9, used only with a 24 volt battery, to a first control relay 300. The opposite side of the control relay 300 is connected via a terminal T3 to the minus side of the battery, referenced B—. The control relay 300 includes a normally open contact 302 having one side connected to B- and an opposite side connected to a terminal T4. The terminal T4 is used for enabling power to the trolling motor speed control. Particularly, with the on/off contacts 202 and 298 in the open position, the relay 300 is deenergized and its associated contact 302 is in the open position. With the contact 302 in the open position, then power is effectively cut off to the trolling motor 34 to disable the same.

The high bypass contact 212 is connected from the terminal T1 to a terminal T5 on the relay board 60 and through a resistor R8, used only with a 24 volt battery, to a second control relay 304. The opposite side of the second control relay 304 is connected to B—. The second control relay 304 includes a normally open contact 306 connected between the terminal T4 and three separate terminals T6-T8. The terminals T6 and T7 are used for connecting the low side of the trolling motor 34, and its associated control, directly to B— to provide maximum speed, while the terminal T8 is used for current sense to the speed control.

Figure 20:
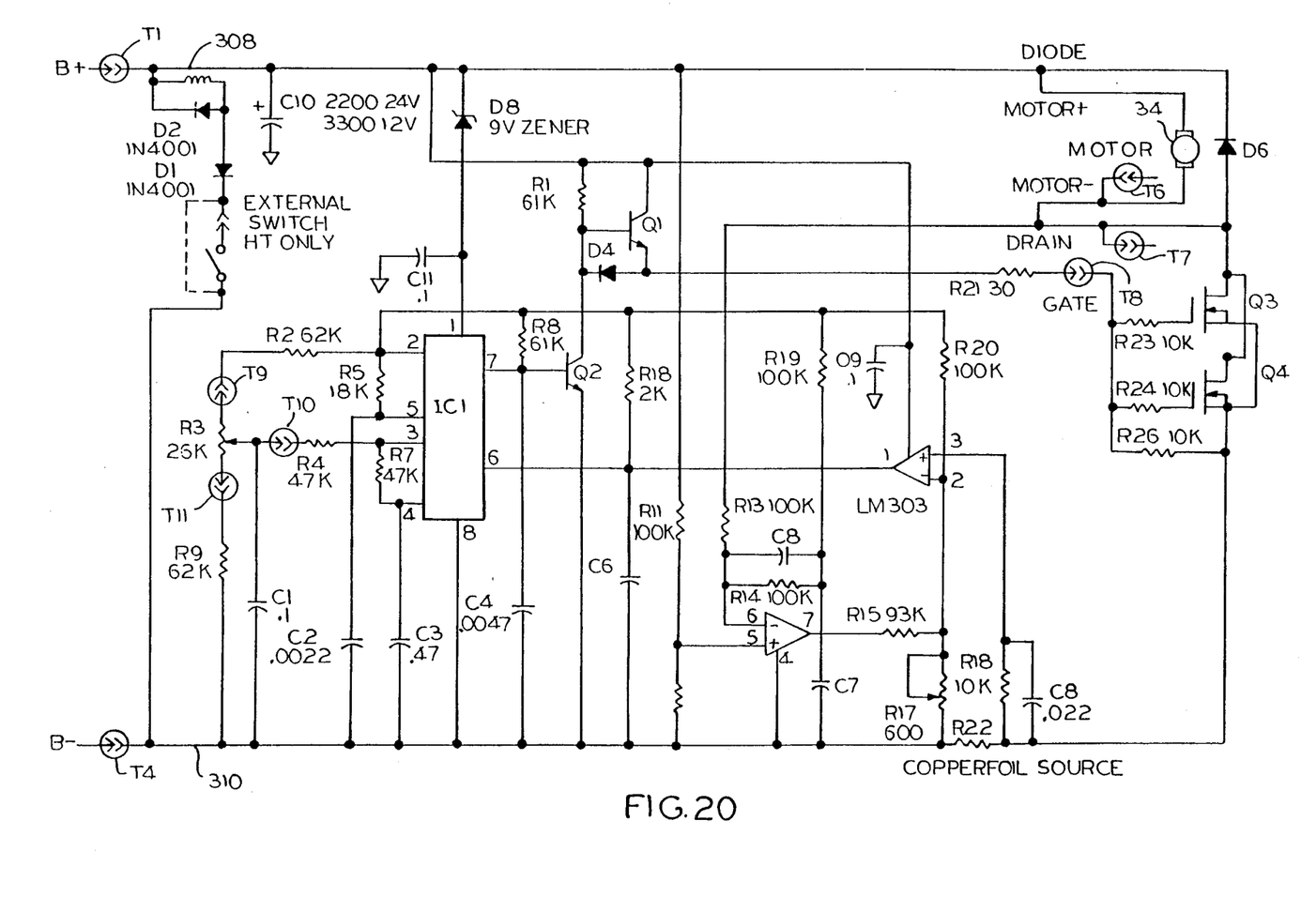
FIG. 20 is a schematic diagram illustrating a speed control circuit in accordance with the invention.

With reference to FIG. 20, a schematic diagram illustrates a circuit on the control board 62 for implementing speed control. The control board 62 includes a separate circuit, discussed below with reference to FIG. 21, for implementing steering control.

The speed control circuit is powered by having one rail 308 connected via the terminal T1 to B+, and a second rail 310 connected to the terminal T4, see FIG. 19. As such, the rail 310 is connected to B— only when the first control relay 300 is energized, as discussed above.

The speed control circuit includes a pulse width modulation (PWM) integrated circuit ICI, such as a 5561 integrated circuit chip which is powered between the rails 308 and 310. The PWM circuit ICI develops a pulse width modulated output at a pin 7 connected to the base of a transistor Q2, in accordance with the speed command developed by the foot pedal speed command system 206. Particularly, the pulse width is proportional to the analog voltage developed as a function of the variable resistance of a potentiometer R8. In accordance with the invention, the potentiometer R8 comprises the speed command membrane potentiometer 210, see FIG. 12, on the foot pedal, connected to the speed control via terminals T9-T11.

The transistor Q2 in turn drives a transistor Q1 which is connected between the plus rail 308 and the gates of parallel FETs Q4 and Q9. The FETs Q4 and Q9 have their source connected through a resistor R22 to the rail 310 and their drains connected to the minus side of the trolling motor 34. The plus side of the trolling motor 34 is connected to the plus rail 308. The motor minus side and the drain are also connected to the respective terminals T6 and T7, see FIG. 19.

In operation, when both the foot pedal constant on switch 198 and the momentary contact switch 186 are deactuated, B— is isolated from the speed control circuit and the trolling motor 34 is disabled. If either the momentary switch 186 or constant on switch 198 is actuated, then its associated contact 298 or 202 is closed to energize the first control relay 300 and close the contact 302, see FIG. 19, to provide B- at terminal T4. The FETs Q4 and Q9 are pulse width modulated proportional to the resistance of the potentiometer R8, or membrane potentiometer 212, see FIG. 12. The speed of the trolling motor 34 is dependent upon the pulse width, i.e, duty cycle. Particularly, the greater the duty cycle, the greater the speed of the trolling motor 34.

If the speed control actuator 208 is moved to the high bypass position, see FIG. 15A, then the switch 212 is closed, energizing the second control relay 304 and closing the contact 306, see FIG. 19. As a result, B— is applied directly to the minus side of the motor 34 to energize the same and to provide an effective duty cycle of 100%. As a result, the FETs Q4 and Q9 are bypassed from the circuit and the motor 34 operates at maximum speed. Once the actuator 208 is moved rearwardly to a position such as illustrated in FIG. 15B, then the contact 212 is open resulting in the contact 306 being opened and the motor 34 being operated in accordance with the duty cycle of the FETs Q4 and Q9.

The remaining portions of the speed control circuit illustrated in the schematic are used for selecting various reference parameters such as pulse width modulation frequency and the like, which do not form part of the invention and are therefore not described in detail herein.

Figure 21:
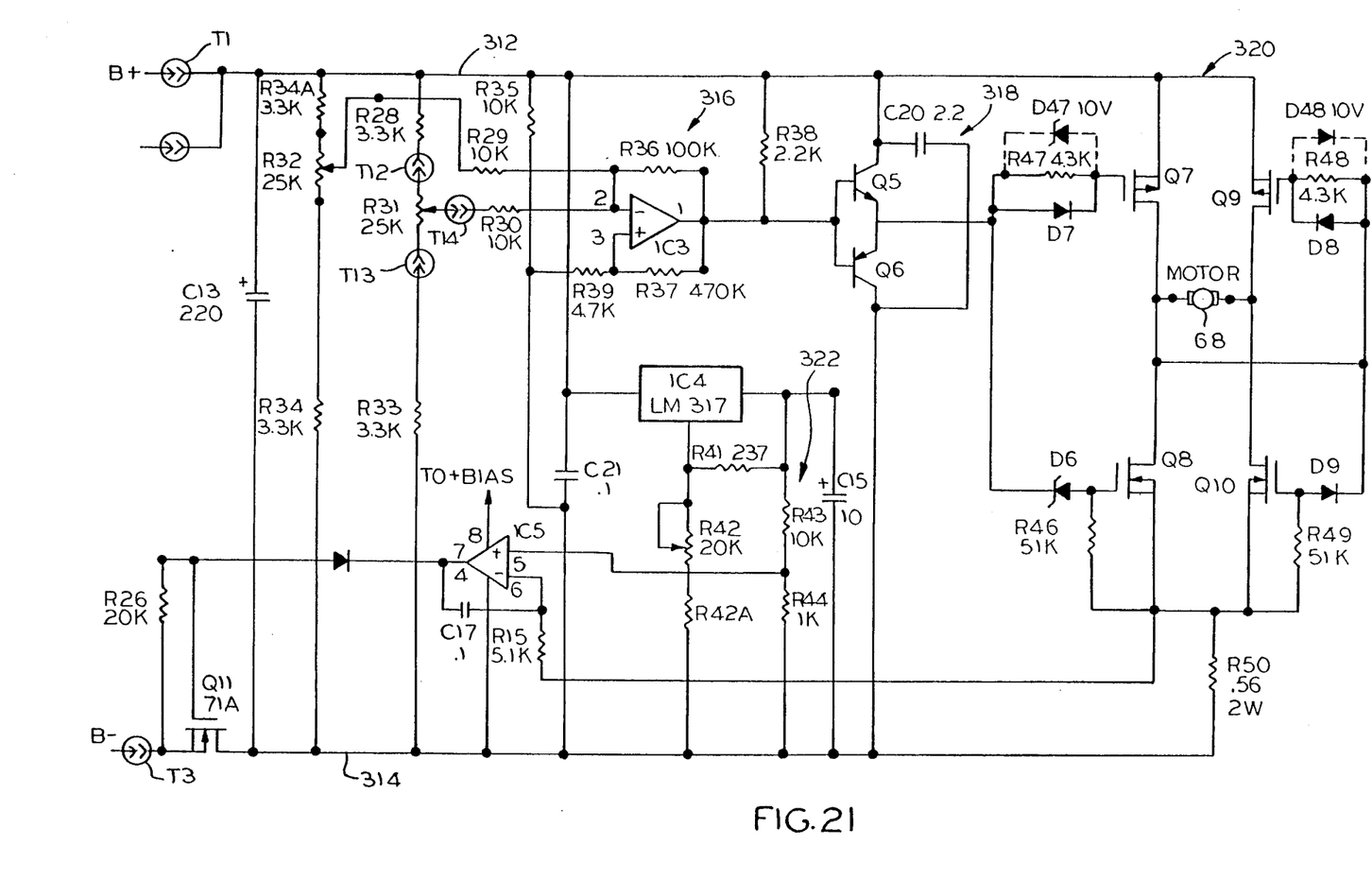
FIG. 21 is a schematic diagram illustrating a steering control circuit in accordance with the invention.

With reference to FIG. 21, a schematic diagram illustrates a circuit on the control board 62 for controlling steering of the trolling motor 34. The steering control circuit is connected both to the B+ and B— terminals T1 and T3, respectively. The terminal T1 is connected to a plus rail 312 and the terminal T3 via a FET Q11 to a minus rail 314. The FET Q11 is used for disabling power to the steering control under select conditions, as discussed below.

A potentiometer R31, which in the illustrated embodiment comprises the steering command membrane potentiometer 190, see FIG. 12, is connected through resistors R28 and R33 to the rails 312 and 314, via terminals T12 and T13. Its wiper is connected via a terminal T14 through a resistor R13 to the inverted input of a comparator IC3. A potentiometer R32, comprising the steering feedback membrane potentiometer 112, see FIG. 5, is connected to the plus rail 312 through a resistor R34A and via a resistor R34 to the minus rail. 314. The resistor R32 has its wiper connected through a resistor R29 also to the inverted input of the comparator IC3.

The comparator IC3 forms part of a fixed frequency oscillator 316 which is configured to operate at approximately 30 Khz. The output of the oscillator 316 is effectively a pulse width modulated signal having a duty cycle corresponding to a difference between the steering command, represented by the resistance of, and thus analog voltage developed by, the potentiometer R31, and the steering feedback, represented by the resistance of, and thus analog voltage developed by, the feedback potentiometer R32. If the voltages generated by the potentiometers R31 and R32 are identical, then the duty cycle of the oscillator output is 50%. If the voltage of one of the potentiometers R31 or R32 is greater than the other, then the duty cycle changes to a value above or below 50% duty cycle dependent upon which potentiometer has the higher resistance value.

The output of the oscillator 316 is connected via a buffer circuit 318 including transistors Q5 and Q6 to an H-bridge circuit 320. The H-bridge circuit 320 is operable to provide bipolar control of the steering servo motor 68. The H-bridge comprises FETs Q7–Q10, with the FETs Q7 and Q8 forming the left side of the H-bridge 320, and the FETs Q9 and Q10 forming the right side of the H-bridge 320. The FETs Q7 and Q9 comprise P-channel FETs, while the FETs Q8 and Q10 comprise N-channel FETs. Each FET Q7–Q10 includes gate drive circuitry, as shown, to provide level shifting and time delay to prevent simultaneous conduction of both FETs on either side of the bridge 320.

The left side of the H-bridge circuit 320 is driven by the buffer circuit 318, while the right side of the H-bridge circuit 320 is driven by the left side. For example, when the output of the buffer circuit 318 is high, then the FET Q7 is turned, while the FET Q8 is turned off. The right side of the bridge 320 being driven by the left side results in the FET Q10 being turned on, and the FET Q11 being turned off. Therefore, the servo motor 68 is connected with its left side connected to the plus rail 312 and its right side connected via the FET Q10 to the minus rail 314 so that the motor 68 rotates in one direction.

Conversely, when the output of the buffer circuit 318 is low, then the FET Q8 is turned on, while the FET Q7 is turned off. As a result, the FET Q9 is turned on, while the FET Q10 is turned off. Thus, the left side of the servo motor 68 is connected to the minus rail 314, while the right side of the motor is connected to the plus rail 312 so that the servo motor 68 rotates in the opposite direction.

As is apparent from the above, owing to the use of the oscillator 316 producing a pulse width modulated signal to drive the bridge 320, the steering motor 68 is virtually always energized, except during periods when the bridge 320 is shifting. With 50% duty cycle PWM operation, i.e, the steering command is equal to the steering feedback, the motor 68 is alternately connected between normal and reverse polarity at a 30 Khz rate. With such high speed switching and the large induction of the motor 68, there exists a net zero DC voltage so that the motor 68 does not rotate. If the balance between the potentiometers R31 and R32 changes, indicating a change in either feedback or steering command, then the duty cycle varies up or down from 50%. Varying the duty cycle varies the relative proportion of time that the motor 68 is connected in a forward or reverse direction, resulting in a net movement in the selected direction. Moreover, speed of rotation of the motor 68 is proportional to the relative duty cycle from 50%. For example, with a duty cycle of 75% the motor 68 is energized with one polarity 75% of the time and the other polarity 25% of the time so that it rotates at a first set speed, owing to the net time difference of 50%. With a 100% duty cycle, the motor 68 is connected in a polarity to rotate in one direction 100% of the time, and the other direction 0% of the time so that the speed of the motor should be twice as high as in the first example.

More particularly, the speed of rotation of the trolling motor 68, and thus rotation of the trolling motor 34 to effect steering, is variable in accordance with the difference of the duty cycle from 50%. Thus, the greater the difference in duty cycle, representing a greater command value from feedback value, the greater the speed, while the lower the difference in duty cycle from 50% the lower the speed. The use of such a control permits quick response in effecting initial steering movement, while permitting the steering system to provide smooth approach to the desired position with minimal overshoot.

To provide motor current limit, a resistor R50 is connected between the minus rail 314 and the H-bridge 320. The resistor R50 develops a voltage proportional to motor current which is connected to the inverted input of a comparator IC5. The non-inverted input of the comparator IC5 is connected via a voltage divider 322 to the output of a voltage regulator circuit IC4. The voltage regulator circuit IC4 may be, for example, an LM317 voltage regulator integrated circuit which develops a regulated output at a select value. The output of the comparator is connected to the gate of the FET Q11. Thus, under normal operating conditions the sensed current is less than the reference set by the voltage regulator IC4 and the voltage divider 322 so that the output of the comparator IC5 is high and the FET Q11 is turned on. If motor current through the steering motor 68 increases to an undesirable level, then the inverted input of the comparator IC5 becomes high, and the output thereof goes low to turn off the FET Q11. With the FET Q11 turned off, then the rail 314 is isolated from B− to disable the steering servo motor 68.

As discussed above, the potentiometer R31 is variable over a range determined by 90° movement of the foot pedal turntable 178, while the potentiometer R32 is varied over range controlled by full movement of the rack 94, see FIG. 5, corresponding to a range of movement between 380° and 400° of the trolling motor 34. Thus, the user can, by rotating the turntable 178 a small amount, develop a steering command which increases the duty cycle output of the oscillator 316 to energize the motor 68 to turn in a select direction until the feedback signal indicates that the command has been satisfied. As discussed above, the initial movement of the motor 68 will be at a relatively higher speed, and gradually slow down until the feedback signal equals the command signal.

Control of the energization of the trolling motor is independent of the steering and results when one of the foot pedal actuated switches 186 or 198 is actuated to command energization of the trolling motor 34, as discussed above relative to FIGS. 19 and 20.

Since the feedback potentiometer 112 senses actual column position, if the trolling motor 34 is rotated as a result of an obstruction to override the friction clutch, then once the obstruction is removed the steering control of FIG. 21 will sense an error and control rotation of the servo motor 68 to return the trolling motor 34 to the desired angular position.

Thus, the trolling motor system 30 in accordance with the invention is provided to enable a user thereof to provide precise control of both steering and speed.

The embodiment disclosed herein is illustrative of the broad inventive concepts comprehended by the invention.

I claim:

1. A trolling motor steering system comprising:
   means for mounting the motor on a boat for rotation about an axis to effect steering of the boat;
   a foot pedal including a fixed member and a rotatable member rotatably mounted to the fixed member, said rotatable member being rotatable by a user to command a desired steering direction;
   foot pedal limit means for limiting relative rotation between said fixed and rotatable members;
   means for sensing relative rotational position between said fixed and rotatable members and generating an analog electrical signal having a level representative of said rotational position, said signal comprising a steering command signal;
   electrical steering means mounted to said mounting means for steering said trolling motor, including drive means for rotating said trolling motor, electrical control means responsive to said steering command signal for actuating said drive means to rotate said trolling motor to steer the boat, and converting means operatively associated with said drive means and said control means for converting a selected rotational movement of said rotatable member, represented by said steering command signal level, to a greater rotational movement of said trolling motor.

2. The trolling motor steering system of claim 1 wherein said converting means converts rotational movement of said trolling motor relative to said rotatable member by a ratio of at least four-to-one.

3. The trolling motor steering system of claim 1 further comprising means for limiting rotational movement of said trolling motor by an angular value in excess of three hundred and sixty degrees, and wherein complete rotational movement of said rotatable member corresponds to complete rotational movement of said trolling motor.

4. The trolling motor steering system of claim 3 wherein said foot pedal limit means limits rotational movement of said rotatable member to an angular value less than one hundred and eighty degrees.

5. The trolling motor steering system of claim 1 further comprising means for limiting rotational movement of said trolling motor by an angular value between approximately three hundred and eighty degrees and four hundred degrees.

6. The trolling motor steering system of claim 5 wherein said foot pedal limit means limits rotational movement of said rotatable member to an angular value of approximately ninety degrees.

7. A trolling motor steering system comprising:
   means for mounting the motor on a boat for rotation about an axis to effect steering of the boat;
   a foot pedal including a fixed member and a rotatable member rotatably mounted to the fixed member, said rotatable member being rotatable by a user to command a desired steering direction;
   means for limiting relative rotation between said fixed and rotatable members;
   means for sensing relative rotational position between said fixed and rotatable members and generating an electrical signal representative thereof, said signal comprising a steering command signal;
   electrical steering means mounted to said mounting means for steering said trolling motor, including drive means for rotating said trolling motor, electrical control means responsive to said steering command signal for actuating said drive means to rotate said trolling motor to steer the boat, and converting means operatively associated with said drive means and said control means for converting a selected rotational movement of said rotatable member, represented by said steering command signal, to a greater rotational movement of said trolling motor, wherein said drive means comprises a driven pinion fixedly connected to a rotating tube carrying said trolling motor and a rack intermeshed with said pinion for linear movement relative thereto, said rack being mounted for limited linear movement in a gear housing to limit rotational movement of said pinion and thus said trolling motor.

8. A trolling motor steering system comprising:
   means for mounting the motor on a boat for rotation about an axis to effect steering of the boat;
   a foot pedal including a fixed member and a rotatable member rotatably mounted to the fixed member, said rotatable member being rotatable by a user to command a desired steering direction;
   means for sensing relative rotational position between said fixed and rotatable members and generating an electrical signal representative thereof, said signal comprising a steering command signal;
   electrical steering means mounted to said mounting means for steering said trolling motor, including drive means for rotating said trolling motor and electrical control means responsive to said steering command signal for actuating said drive means to rotate said trolling motor to steer the boat, wherein said drive means comprises a driven pinion fixedly connected to a rotating tube carrying said trolling motor and a rack intermeshed with said pinion for linear movement relative thereto, said rack being mounted for limited linear movement in a gear housing to limit rotational movement of said pinion and thus said trolling motor.

9. The trolling motor steering system of claim 8 wherein said rack is mounted in said gear housing for limiting rotational movement of said trolling motor by an angular value in excess of three hundred and sixty degrees.

10. The trolling motor steering system of claim 8 wherein said rack is mounted in said gear housing for limiting rotational movement of said trolling motor by an angular value between approximately three hundred and eighty degrees and four hundred degrees.

11. A trolling motor steering system comprising:
means for mounting the motor on a boat for rotation about an axis to effect steering of the boat;
a foot pedal including a base and a foot actuable member pivotally mounted to the base, said foot actuable member being movable by a user to command a desired steering direction;
means for sensing relative pivotal movement between said base and foot actuable member and generating a steering command representative thereof;
steering means mounted to said mounting means for steering said trolling motor, including drive means for rotating said trolling motor and electrical control means responsive to said steering command for actuating said drive means to rotate said trolling motor to steer the boat, wherein said drive means comprises a driven pinion fixedly connected to a rotating tube carrying said trolling motor and a rack intermeshed with said pinion for linear movement relative thereto, said rack being mounted for limited linear movement in a gear housing to limit rotational movement of said pinion and thus said trolling motor.

12. The trolling motor steering system of claim 11 wherein said rack is mounted in said gear housing for limiting rotational movement of said trolling motor by an angular value in excess of three hundred and sixty degrees.

13. The trolling motor steering system of claim 11 wherein said rack is mounted in said gear housing for limiting rotational movement of said trolling motor by an angular value between approximately three hundred and eighty degrees and four hundred degrees.

14. A trolling motor steering system comprising:
means including a rotatable column connected to the motor for mounting the motor on a boat for rotation about an axis to effect steering of the boat;
a foot pedal including a base and a foot actuable member pivotally mounted to the base, said foot actuable member being movable by a user to command a desired steering direction;
means for sensing relative pivotal movement between said base and foot actuable member and generating a steering command representative thereof;
steering means mounted in a housing to said mounting means for steering said trolling motor, including drive means for rotating said column to steer said trolling motor, control means responsive to said steering command for actuating said drive means to rotate said trolling motor to steer the boat, a rotary indicator mounted to said housing to indicate steering direction, and a belt drive drivingly connecting said column to said indicator so that said indicator rotates in response to rotational movement of said column.

15. The trolling motor steering system of claim 14 wherein said belt drive comprises a drive pulley fixed relative to and rotational with said column and said indicator is fixed relative to and rotational with a driven pulley, and a belt is driven by said drive pulley to drive said driven pulley.

16. The trolling motor steering system of claim 15 wherein said pulleys comprise toothed pulleys and said belt comprises a cogged belt.

17. A trolling motor steering system comprising:
means for mounting the motor on a boat for rotation about an axis to effect steering of the boat;
a foot pedal including a base and a foot actuable member pivotally mounted to the base, said foot actuable member being movable by a user to command a desired steering direction;
means for sensing relative pivotal movement between said base and foot actuable member and generating a steering command representative thereof;
steering means mounted in a housing to said mounting means for steering said trolling motor, including drive means for rotating said trolling motor and control means responsive to said steering command for actuating said drive means to rotate said trolling motor to steer the boat, said drive means comprising a friction clutch- having a clutch output shaft operatively coupled to said trolling motor and including an annular shoulder, an input gear driven by said control means and coaxial with said shaft and seated on said shoulder, and biasing means for maintaining said input gear in frictional engagement with said shoulder so that said shaft is rotational with said input gear in the absence of a force acting on said trolling motor in excess of frictional forces of said engagement.

18. The trolling motor steering system of claim 17 wherein said shoulder and said input gear include engaged radially extending teeth to define a friction, ratchet clutch.

19. The trolling motor steering system of claim 17 wherein said input gear comprises a plastic gear.

20. The trolling motor steering system of claim 17 further comprising a direction indicator rotatably mounted to said housing and wherein said drive means further comprises a drive pulley fixed relative to and rotational with said clutch output shaft, a driven pulley fixed relative to and rotational with said indicator, and a belt driven by said drive pulley to drive said driven pulley.

21. The trolling motor steering system of claim 20 wherein said pulleys comprise toothed pulleys and said belt comprises a cogged belt.

22. A trolling motor steering system comprising:
means for mounting the motor on a boat for rotation about an axis to effect steering of the boat;
a foot pedal including a base and a turntable rotatably mounted to said base, said turntable being rotatable by a user to command a desired steering direction;
foot pedal limit means for limiting relative rotation between said base and said turntable;
potentiometer means for sensing rotational position between said base and said turntable and generating an electrical signal representative thereof, said signal comprising a steering command signal;
electrical steering means mounted to said mounting means for steering said trolling motor, including a servo drive for rotating said trolling motor, electrical control means responsive to said steering command signal for energizing said servo drive to rotate said tooling motor to steer the boat, and converting means operatively associated with said control means for converting a selected rotational movement of said turntable, represented by said steering command signal, to a greater rotational movement of said trolling motor.

23. The trolling motor steering system of claim 22 wherein said converting means converts rotational movement of said trolling motor relative to said rotatable member by a ratio of at least four-to-one.

24. The trolling motor steering system of claim 23 further comprising means for limiting rotational movement of said trolling motor by an angular value in excess of three hundred and sixty degrees, and wherein complete rotational movement of said turntable corresponds to complete rotational movement of said trolling motor.

25. The trolling motor steering system of claim 24 wherein said first limiting means limits rotational movement of said turntable to an angular value legs than one hundred and eighty degrees.

26. The trolling motor steering system of claim 22 further comprising means for limiting rotational movement of said trolling motor by an angular value between approximately three hundred and eighty degrees and four hundred degrees.

27. The trolling motor steering system of claim 26 wherein said foot pedal limit means limits rotational movement of said turntable to an angular value of approximately ninety degrees.

28. A trolling motor steering system comprising:
means for mounting the motor on a boat for rotation about an axis to effect steering of the boat;
first means for sensing rotational position of said motor to develop an electrical signal representative of said rotational position, said signal comprising a steering feedback signal;
a foot pedal including a base and a foot pad pivotally mounted to the base, said foot pad being pivotal by a user to command a desired steering direction;
second means for sensing pivotal position of said foot pad relative to said base to develop an electrical signal representative of said pivotal position, said signal comprising a steering command signal;
electrical steering means mounted to said mounting means for steering said trolling motor, including drive means for rotating said trolling motor and electrical control means responsive to a difference between said steering command signal and said steering feedback signal for actuating said drive means to rotate said trolling motor to steer the boat, said control means including means for varying speed of said drive means in response to a level of said difference.

29. The trolling motor steering system of claim 28 wherein said drive means comprises a servo motor and said electrical control means includes a bridge circuit for selectively energizing said servo control motor responsive to a non-zero difference between said feedback signal and said command signal.

30. The trolling motor steering system of claim 29 wherein said bridge circuit controls polarity of energization of said servo control motor responsive to polarity of said difference.

31. The trolling motor steering system of claim 28 wherein said varying means includes an oscillator circuit which varies duty cycle of said control means responsive to said level.

32. A trolling motor steering system comprising:
means for mounting the motor on a boat for rotation about an axis to effect steering of the boat;
a foot pedal including a base and a foot pad pivotally mounted to the base, said foot pad being pivotal by a user to command a desired steering direction;
first means for sensing rotational position of said motor to develop an electrical signal representative of said rotational position, said signal comprising a steering feedback signal;
second means for sensing pivotal position of said foot pad relative to said base to develop an electrical signal representative of said pivotal position, said signal comprising a steering command signal;
a drive circuit connected to said first and second sensing means for developing a pulse drive signal having a duty cycle corresponding to a difference between said command signal and said steering signal;
a bridge circuit driven by said drive circuit and having a bipolar output having a polarity determined responsive to a state of said pulse drive signal;
a servo motor connected to said bridge circuit output and rotational in a direction corresponding to said polarity and at a speed corresponding to said duty cycle; and
gear drive means actuated by said servo control motor for rotating said trolling motor to steer the boat.

33. The trolling motor steering system of claim 32 wherein said drive circuit comprises a fixed frequency oscillator.

34. The trolling motor steering system of claim 32 wherein said drive circuit develops a fifty percent duty cycle pulse drive signal responsive to a zero difference.

35. The trolling motor steering system of claim 32 wherein said bridge circuit comprises an H-Bridge circuit.

36. The trolling motor steering system of claim 35 wherein a first leg of said H-bridge circuit is driven by said drive circuit and a second leg of said H-bridge circuit is driven by said first leg.

37. A trolling motor comprising:
means for mounting the motor on a boat for rotation about an axis to effect steering of the boat;
steering means mounted to said mounting means for rotating said trolling motor, said steering means comprising drive means for commanding rotation of said trolling motor and a friction clutch having a clutch output shaft operatively coupled to said trolling motor and including an annular shoulder, an input gear driven by said drive means and coaxial with said shaft and seated on said shoulder, and biasing means for maintaining said input gear in frictional engagement with said shoulder so that said shaft is rotational with said input gear in the absence of a force acting on said trolling motor in excess of frictional forces of said engagement.

38. The trolling motor of claim 37 wherein said shoulder and said input gear include engaged radially extending teeth to define a friction, ratchet clutch.

39. The trolling motor of claim 37 wherein said input gear comprises a plastic gear.

40. The trolling motor of claim 37 further comprising a direction indicator rotatably mounted to a housing and wherein said drive means further comprises a drive pulley fixed relative to and rotational with said clutch output shaft, a driven pulley fixed relative to and rotational with said indicator, and a belt driven by said drive pulley to drive said driven pulley.

41. The trolling motor of claim 40 wherein said pulleys comprise toothed pulleys and said belt comprises a cogged belt.

* * * * *